United States Patent Office 3,397,592
Patented Aug. 20, 1968

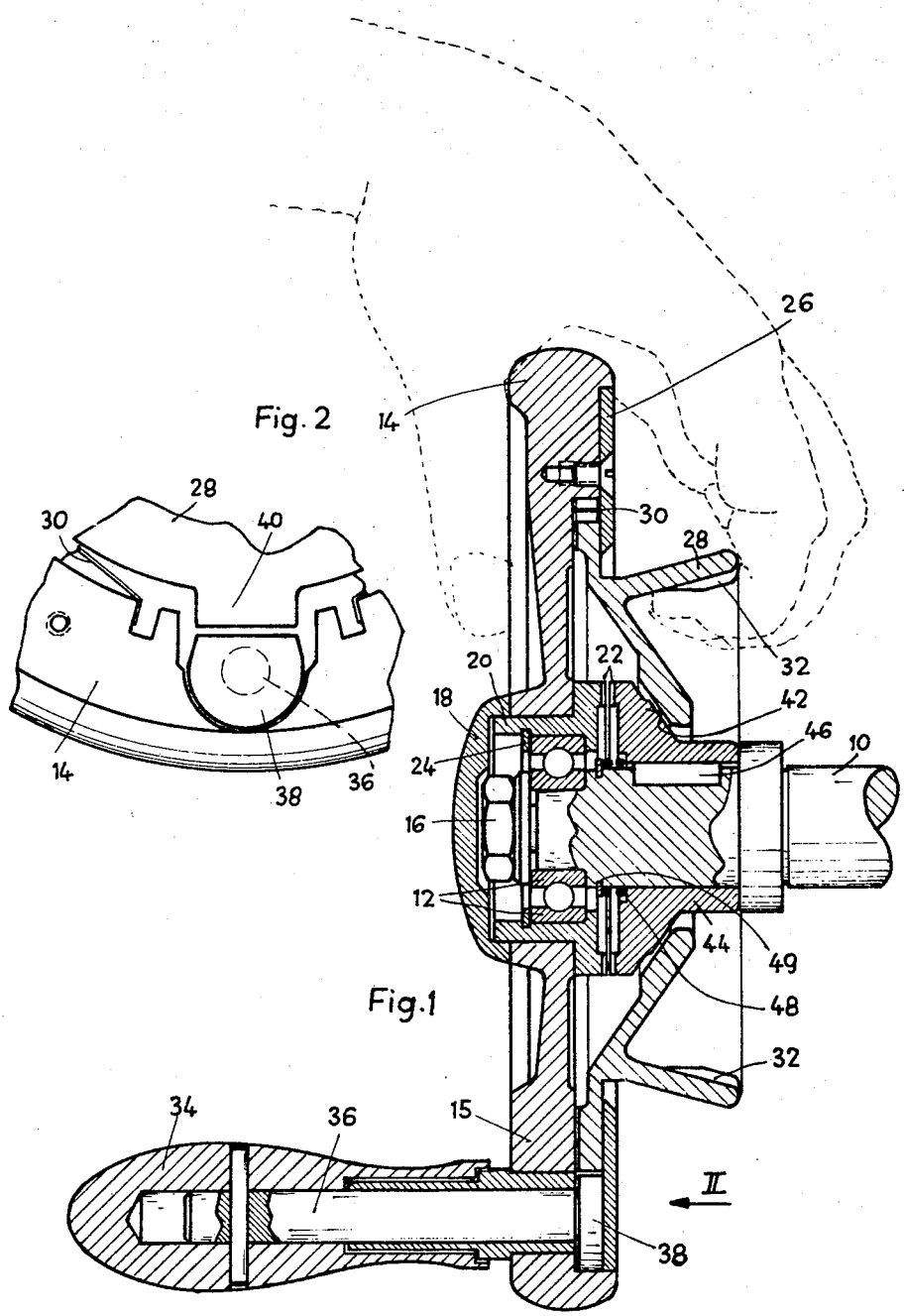

3,397,592
HANDWHEEL FOR MACHINE TOOLS AND THE LIKE
Johann Müller, Munich, Germany, assignor to Friedrich Deckel Präzisions Mechanik und Maschinenbau, Munich, Germany, a firm of Germany
Filed Feb. 7, 1966, Ser. No. 525,483
Claims priority, application Germany, Feb. 9, 1965, D 46,478
9 Claims. (Cl. 74—548)

ABSTRACT OF THE DISCLOSURE

A handwheel loosely mounted on a shaft and normally uncoupled from the shaft so that the handwheel will not be turned when the shaft is rotated by power means. When it is desired to turn the shaft by the handwheel rather than by power means, cooperating clutch parts on the shaft and the handwheel are moved relative to each other in an axial direction. In a first embodiment, a clutch part on the shaft moves axially. In a second embodiment, a clutch part on the handwheel moves axially. In both embodiments, the clutching movement may be accomplished by manually grasping a collar on the rear of the handwheel. In the first embodiment, clutching may also be accomplished by slight turning of a crank handle relative to the handwheel, which causes a camming action to engage the clutch.

---

In various environments, there is a movable part which may be moved either by power or by a handwheel. Frequently the mechanism is so constructed that if the movable part is moved by the power operating means, this causes rotation of the handwheel. Such an arrangement is often found in modern machine tools, where for example both power feed means and handwheel feed means may be connected to a work table, a feed slide, or other suitable part.

When the handwheel has a smooth periphery and no crank handle, the rapid rotation of the handwheel when the movable part is driven by the power operating means presents no particular hazard. However, if the handwheel has a crank handle permanently secured to the handwheel to turn therewith, then the rapid power-driven rotation of the handwheel with the protruding crank handle presents a hazard to a person in the vicinity.

An object of the present invention is the provision of a generally improved and more satisfactory handwheel, eliminating the hazard above mentioned.

Another object is the provision of a simple and satisfactory construction in which the handwheel is rotatable on the shaft on which it is mounted, so that it does not necessarily rotate with the shaft when the shaft is driven by power means, but may be optionally coupled to the shaft in a simple manner.

Still another object is the provision of a handwheel rotatable on its shaft, and carrying a crank permanently mounted on the handwheel, so designed that the handwheel may be coupled to the shaft either by grasping the crank and slightly turning it, or by grasping the rim of the handwheel.

These and other desirable objects may be attained in the manner disclosed as an illustrative embodiment of the invention in the following description and in the accompanying drawings forming a part hereof, in which:

FIG. 1 is a view in diametrical axial section showing a handwheel according to a preferred embodiment of the invention;

FIG. 2 is a fragmentary rear elevation of the same, looking in the direction of the arrow II in FIG. 1.

Figure 3:
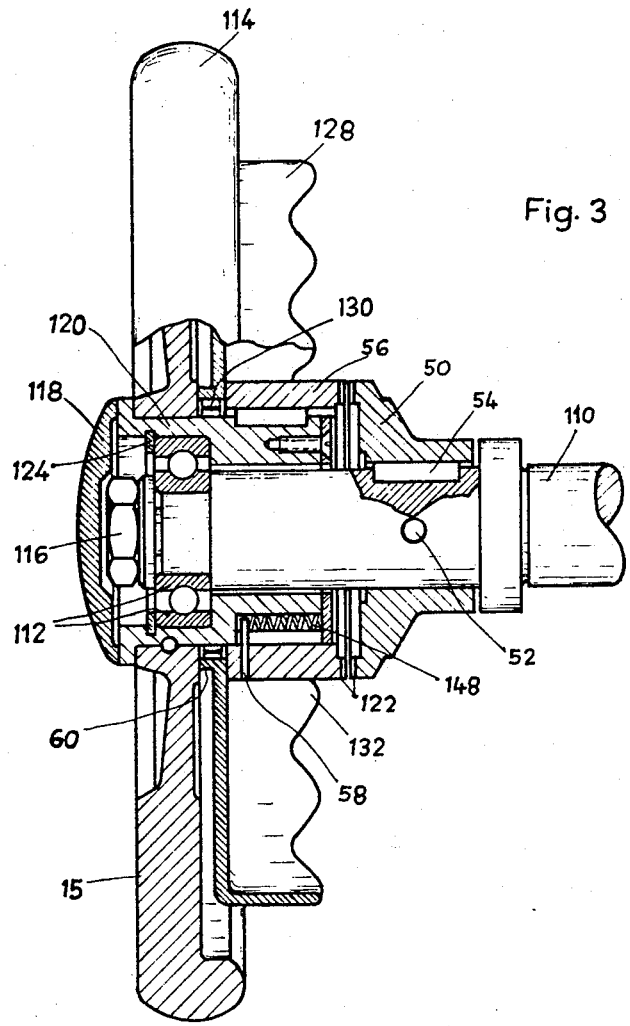
FIG. 3 is a view similar to FIG. 1 showing a different embodiment of the invention.

Referring first to the preferred embodiment shown in FIGS. 1 and 2, the shaft on which the handwheel is mounted is indicated at 10. From what has already been said, it will be understood that this represents a shaft of a machine tool or other piece of machinery which is to be turned manually at times, by means of a handwheel, and which at other times is to be rotated by a power drive, the problem being to avoid rotation of the handwheel when the shaft is driven by the power drive, so as to avoid possible injury to persons in the vicinity.

Rotatably mounted on this shaft 10 is the handwheel 14 which is mounted on a low friction ball bearing 12. The inner race of the ball bearing, tight on the shaft 10, is held thereon by a nut 16 on the end of the shaft. The outer race of the ball bearing engages a sleeve 20 and is held against axial displacement in the sleeve by a spring clip or circlip 24. The handwheel 14 is tightly mounted on the sleeve 20 and is nonrotatable with respect to the sleeve. A cap 18 mounted on the outer end of the sleeve covers the nut 16 and the end of the shaft 10. The inner end of the sleeve is formed with clutch teeth 22.

The handwheel is eccentrically weighted as at 15, so that when the shaft 10 is turned by power means, the eccentric weighting easily overcomes the slight friction of the ball bearing, and the handwheel can remain stationary even though the shaft 10 turns. The eccentric weighting or off-balance weighting of the handwheel is further assisted in this respect by the weight of the handle 34, further described below.

On the rear face of the handwheel 14 there is a ring 26, the outer periphery of which is held tight against the handwheel and fastened thereto by screws. The inner periphery of the ring 26 is spaced axially from the handwheel and provides a space for slidably receiving an outwardly extending radial flange on a collar 28. In addition to the flange which is held by the ring 26, the collar 28 also has a rearwardly extending flange in a convenient position to be grasped by the fingers of an operator whose hand is on the rim of the wheel 14, as shown in broken lines, and it also has another flange extending inwardly toward the shaft 10, but with a sufficiently large central opening so that the collar 28 is able to have a limited amount of radial movement in any radial direction relative to the handwheel 14.

The collar 28 is normally held in a central position by an undulating spring 30 which extends around the periphery of the collar 28. The inner face of the gripping flange is provided, at intervals around the circumference with thickened portions or projections 32 which serve as grips, that is, portions to prevent the fingers of the operator from slipping circumferentially around this flange.

At one point on its periphery, the wheel 14 has a forwardly projecting crank handle 34 nonrotatably pinned to a supporting pin 36 which projects forwardly from the handwheel 14 and which is mounted for limited rotational movement relative to the handwheel. The rear end of the pin 36 has a cam portion 38 which cooperates with a projection 40 at one point on the periphery of the collar 28. This projection 40 also enters somewhat loosely into a notch in the wheel 14, as seen in FIG. 2, to prevent the collar 28 from turning relative to the wheel 14 except to a very limited extent.

The inwardly projecting flange on the collar 28 has a front surface 42 inclined at an appropriate angle of about 45 degrees or a little steeper than 45 degrees to the axis of the shaft 10. This angular surface is slightly spaced rearwardly from but very close to a rearwardly faced corresponding conical angular surface on the coupling member or clutch member 44, which surrounds the shaft 10 and is freely slidable to a limited extent in an axial direction on the shaft, but is prevented from rotation relative to the shaft by the key or feather 46. A spring 48 coiled around the shaft in front of the clutch member 44 reacts rearwardly against the clutch member to tend to press it rearwardly, and is held at its forward end by a spring clip or circlip 49. The front face of the clutch member 44 has clutch teeth 22 corresponding to and adapted to mate with the similar clutch teeth 22 on the rear face of the sleeve 20.

The operation of this embodiment of the invention is as follows: when the shaft 10 is turned by the power drive means, the clutch 44 is normally in its rearmost disconnected position, unclutched from the sleeve 20 and handwheel 14, so that the handwheel remains stationary. If the operator wishes to turn the shaft 10 by hand, he can do so in two ways. First, he can grasp the rim of the handwheel 14 in the manner shown by broken lines, with his fingers gripping the inner surface of the rearwardly extending flange on the collar 28, as illustrated. He then flexes his fingers to pull the rim of the collar 28 radially outwardly, whereupon the entire collar 28 is displaced from its central position, against the slight force of the centering spring 30. Thus on the diametrically opposite side of the collar 28 from the side which is grasped by the fingers, the inclined surface 42 will engage the correspondingly inclined surface of the clutch member 44 and will move the clutch member 44 axially forwardly, against the force of the spring 48, engaging the teeth 22 on the clutch member 44 with the corresponding teeth 22 on the handwheel. The handwheel thus becomes non-rotatably connected to the shaft 10, so that manual turning of the handwheel will cause corresponding manual turning of the shaft 10, so long as the clutch remains in its engaged or clutched position. As soon as the radial displacing force on the collar 28 is released, the spring 30 will restore this collar to its central position relative to the shaft 10, and the spring 48 will move the clutch member 44 rearwardly to unclutch it from the handwheel.

The second way in which the operator may turn the handwheel manually, is by grasping the crank handle 34. A slight turn of the wrist will turn the handle 34 and its pin 36, so that the cam portion 38 thereon will engage the portion 40 of the collar 28, and will move this collar in a diametrical direction, so that the inclined surface 42 thereof will move the clutch member 44 forwardly to a clutching position, in the same way as when the rim of the collar 28 was grasped by the fingers as above described. The operator can make as many revolutions of the handcrank 34 as desired, meanwhile keeping sufficient grip on the handcrank so that as the crank turns the handwheel 14, it also maintains the cam 38 in the camming position relative to the portion 40 of the collar 28, to maintain the clutching action. When the grip on the handle 34 is released, the spring 30 again centers the collar 28, and the clutch becomes disengaged.

A second embodiment of the invention is illustrated in FIG. 3, where many of the parts are the same as those in the first embodiment, and are identified by the same reference numerals with the addition of 100 to each such numeral, no further description of these similar parts being required.

The handwheel 114 is supported, as before, by the ball bearings 112 from the shaft 110, in such a manner that it can easily rotate freely. The fastening nut 116 is covered by the cap 118. A coupling element or clutch element 50 is mounted on the shaft 110, and has at its front end clutch teeth 122 which engage similar clutch teeth 122 on the clutch portion 56 fastened to the handwheel 114. In the first embodiment, the clutch member on the shaft was axially movable and the clutch member on the handwheel was axially stationary. In this second embodiment, the arrangement is reversed. The clutch element 50 on the shaft 110 is rigidly keyed to the shaft by the key 54 and further fastened by the diametrical pin 52, so that it does not move axially on the shaft. The other clutch member 56 is non-rotatably fastened to the handwheel 114 so as to rotate therewith, but is axially movable relative to the handwheel and shaft, through a limited range. A plurality of coil springs 148, extending parallel to the shaft 110 and distributed at circumferential intervals around the shaft, press at their rear ends against an annular plate screwed to the rear end of the hub of the wheel 114, and press at their forward ends against pins 58 mounted on the clutch part 56, thus tending to move the clutch member 56 axially forwardly to keep its clutch teeth 122 disengaged from the clutch teeth 122 of the other clutch part 50.

There is a collar 128 surrounding the hub of the wheel 114, the inner edge of the collar being interposed between the rear face of the wheel 114 and the front edge of the clutch part 56, as well illustrated in FIG. 3. A narrow shoulder 60, in the form of an annular flange, projects forwardly from the inner edge of the collar 128 and bears against the rear face of the handwheel. This flange 60 acts as a fulcrum for pivoting movement of the collar 128.

If the operator's hand is placed over the rim of the wheel and the fingers are engaged with the outer rim of the member 128, in much the same way illustrated by broken lines in FIG. 1, and if the fingers are then flexed to tend to move the grasped portion of the periphery of the member 128 axially forwardly, this will pivot the member 128 on the flange 60, acting as a fulcrum, so that the diametrically opposite portion of the member 128 will tilt rearwardly, carrying the clutch member 56 axially rearwardly, upon overcoming the forward force of the springs 148. This will bring the clutch teeth 122 on the rear edge of the clutch member 56 into engagement with the similar clutch teeth 122 on the forward face of the clutch member 50, thereby coupling the handwheel 114 to the shaft 110, since the clutch member 56 is non-rotatably mounted on the handwheel. Any turning movement imparted to the handwheel will then be imparted to the shaft 110. Upon releasing the grip on the member 128, the springs 148 will press the clutch member 56 axially forwardly to disengage the clutch, freeing the handwheel from the shaft, and the collar 128 will resume its normal position with the main radial flange thereof parallel to the rear face of the handwheel, this being the position illustrated in FIG. 3. In order to allow the tilting movement of the collar 128 for engaging the clutch, the inside diameter of the collar is, of course, somewhat greater than the outside diameter of the hub on which it is mounted, and an undulating spring 130 extending circumferentially around the hub tends to keep the collar 128 centered relative to the hub.

It is noted that in both embodiments, a gripping element (28 or 128) is mounted on the rear of the handwheel and it is moved (either by direct finger pressure, as in both embodiments, or through the medium of the crank handle 34, as in the first embodiment) to establish the desired driving connection between the handwheel and the shaft. In the specific form illustrated, the movement of the gripping element serves to operate a mechanical clutch, but such movement could just as well serve to close a conventional electric switch in the control circuit of an electrically operated clutch, such as a conventional magnetic clutch. In addition, or as an alternative, the movement of the gripping element could open a normally closed conventional electric switch in the control circuit of the power drive means for driving the shaft, thus insuring that the powder drive could not be accidentally started while the handwheel is coupled to the shaft.

It is seen from the foregoing disclosure that the objects and purposes of the invention are well fulfilled. It is to be understood that the foregoing disclosure is given by way of illustrative example only, rather than by way

What is claimed is:

1. A handwheel assembly comprising a shaft, a handwheel freely rotatable on said shaft, coupling means for detachably coupling said handwheel to said shaft to transmit rotary movements of said handwheel to said shaft, and actuating means for rendering said coupling means effective, said actuating means lying behind said handwheel and including a gripping element arranged on the rear of said handwheel and radially inwardly from the rim thereof and lying within the grasp of the fingers of a hand grasping the rim of said handwheel with the fingers extending radially inwardly from and behind said rim.

2. A handwheel assembly comprising a shaft, a handwheel freely rotatable on said shaft, coupling means for detachably coupling said handwheel to said shaft to transmit rotary movements of said handwheel to said shaft, and actuating means for rendering said coupling means effective, said actuating means including a gripping element arranged on the rear of said handwheel and lying within the grasp of the fingers of a hand grasping the rim of said handwheel, said gripping element being in the form of an annular collar surrounding said shaft and having a rearwardly directed annular flange engageable by the fingers of an operator to displace said collar from a normal rest position and thereby rendering said coupling means effective, and spring means resiliently tending to maintain said collar in said normal rest position.

3. A construction as defined in claim 2, wherein said collar in its normal rest position is supported concentrically in said handwheel, and is displaceable in a radial direction from said normal rest position.

4. A construction as defined in claim 3, wherein said coupling means includes a clutch element non-rotatably mounted on said shaft and axially slidable thereon, said clutch element having an inclined surface, and wherein said collar has an inclined surface cooperating with said inclined surface on said clutch element and effective, when said collar is moved radially from its said normal rest position, to engage said inclined surface on said clutch element and move said clutch element axially on said shaft to an effective clutching position.

5. A construction as defined in claim 3, wherein said handwheel has a crank handle mounted thereon for limited rotation relative to said handwheel, and cam means operated by rotation of said crank handle relative to said handwheel for displacing said collar radially, thereby to render said coupling means effective.

6. A construction as defined in claim 2, wherein said rearwardly directed annular flange is provided with finger grips.

7. A construction as defined in claim 2, wherein said handwheel is eccentrically weighted to tend to hold it stationary while said shaft rotates when said coupling means is ineffective.

8. A handwheel assembly comprising a shaft, a handwheel freely rotatable on said shaft, coupling means for detachably coupling said handwheel to said shaft to transmit rotary movements of said handwheel to said shaft, and actuating means for rendering said coupling means effective, said actuating means including a gripping element arranged on the rear of said handwheel and lying within the grasp of the fingers of a hand grasping the rim of said handwheel, said coupling means including a first clutch element fixed to said shaft and a second clutch element non-rotatably mounted on said handwheel and axially movable thereon between a disengaged position relative to said first element and an engaged position in clutching relation to said first element, and spring means tending to shift said second element toward its disengaged position, and said gripping element of said actuating means including a portion interposed between said handwheel and said second clutch element and effective, upon grasping and tilting said gripping element, to shift said second clutch element axially to its engaged position.

9. A construction as defined in claim 8, wherein said gripping element has a narrow annular flange concentric with said shaft and faced toward said handwheel and serving as a fulcrum shoulder on which said gripping element may tilt when one portion of the periphery thereof is gripped and moved axially toward said handwheel.

References Cited

UNITED STATES PATENTS 2,527,458   10/1950   Schurr     74—548 X
3,206,238   9/1965   Speight et al.     74—548 X MILTON KAUFMAN, *Primary Examiner.*